US011021176B2

(12) United States Patent
Tian et al.

(10) Patent No.: US 11,021,176 B2
(45) Date of Patent: Jun. 1, 2021

(54) ENERGY ABSORPTION DEVICE AND RAIL VEHICLE HAVING SAME

(71) Applicant: CRRC QINGDAO SIFANG CO., LTD., Shandong (CN)

(72) Inventors: Aiqin Tian, Shandong (CN); Yonggui Zhang, Shandong (CN); Shizhong Zhao, Shandong (CN); Guidong Tao, Shandong (CN); Quanwei Che, Shandong (CN); Shuxiang Chen, Shandong (CN); Xianliang Sun, Shandong (CN); Luxing Li, Shandong (CN)

(73) Assignee: CRRC QINGDAO SIFANG CO., LTD., Shandong (CN)

( * ) Notice: Subject to any disclaimer, the term of this patent is extended or adjusted under 35 U.S.C. 154(b) by 551 days.

(21) Appl. No.: 15/760,543

(22) PCT Filed: Jul. 27, 2016

(86) PCT No.: PCT/CN2016/091899
§ 371 (c)(1),
(2) Date: Mar. 15, 2018

(87) PCT Pub. No.: WO2017/054567
PCT Pub. Date: Apr. 6, 2017

(65) Prior Publication Data
US 2019/0039631 A1    Feb. 7, 2019

(30) Foreign Application Priority Data

Sep. 30, 2015  (CN) .......................... 201510642650.0
Sep. 30, 2015  (CN) .......................... 201520796535.4

(51) Int. Cl.
*B61G 11/18*      (2006.01)
*B61D 15/06*     (2006.01)
(Continued)

(52) U.S. Cl.
CPC .............. *B61G 11/18* (2013.01); *B60R 19/34* (2013.01); *B61D 15/06* (2013.01); *B61F 19/04* (2013.01); *B61G 11/16* (2013.01)

(58) Field of Classification Search
CPC .... B61F 15/06; B61F 1/10; B61F 9/04; B61F 19/04; B61D 17/06; B61D 15/06;
(Continued)

(56) References Cited

U.S. PATENT DOCUMENTS 3,223,052 A * 12/1965 Gutridge .................. B61G 9/12
                                                              105/454
2002/0178967 A1* 12/2002 Heinisch ................ B61D 15/06
                                                              105/220

(Continued)

FOREIGN PATENT DOCUMENTS

CN          201432693 Y       3/2010
CN          101801757 A       8/2010

(Continued)

OTHER PUBLICATIONS

The Japanese First Office Action along with English translation dated Mar. 25, 2019.

(Continued)

*Primary Examiner* — Scott A Browne
(74) *Attorney, Agent, or Firm* — Yue (Robert) Xu; Apex Attorneys at Law, LLP

(57) ABSTRACT

An energy absorption device configured to be provided at a front end of a train includes a coupler seat, a support base, a crush pipe, a coupler, a guide member, an energy absorption component and an anti-climbing assembly. The support base is fixedly arranged at the front end of the train; the crush pipe is fixed to the coupler seat; a connecting end of the coupler is inserted into the crush pipe and is slidable with respect to the crush pipe; the guide member has one end (Continued)

fixed to the coupler seat, and another end inserted into the support base and slidable with respect to the support base; the guide member limits an oscillation of the crush pipe; the energy absorption component is provided between the coupler seat and the support base; and the anti-climbing assembly is fixedly arranged on the support base and is compressible.

15 Claims, 12 Drawing Sheets

(51) Int. Cl.
    *B61G 11/16*     (2006.01)
    *B60R 19/34*     (2006.01)
    *B61F 19/04*     (2006.01)

(58) Field of Classification Search
    CPC .......... B61G 9/04; B61G 11/18; B61G 11/16; B62D 21/15; B60R 19/34
    See application file for complete search history.

(56) References Cited

U.S. PATENT DOCUMENTS

2008/0277366 A1    11/2008    Kemper
2009/0065462 A1    3/2009    Gansweidt
2010/0023020 A1    1/2010    Barker
2010/0064931 A1    3/2010    Heinisch et al.
2016/0152247 A1    6/2016    Sano et al.

FOREIGN PATENT DOCUMENTS

| CN | 102216141 A | | 10/2011 | |
| --- | --- | --- | --- | --- |
| CN | 103507823 A | | 1/2014 | |
| CN | 103625502 A | * | 3/2014 | ............... B61G 9/04 |
| CN | 103625502 A | | 3/2014 | |
| CN | 203612011 U | | 5/2014 | |
| CN | 105151075 A | | 12/2015 | |
| CN | 205168530 U | | 4/2016 | |
| DE | 202006014402 U1 | | 11/2006 | |
| EP | 0802100 A1 | | 10/1997 | |
| JP | 2009001178 A | | 1/2009 | |
| WO | 2009072843 A2 | | 6/2009 | |
| WO | 2015015747 A1 | | 2/2015 | |

OTHER PUBLICATIONS

International Search Report for PCT/CN2016/091899, dated Oct. 25, 2016, ISA/CN.

* cited by examiner

ENERGY ABSORPTION DEVICE AND RAIL VEHICLE HAVING SAME

This application is the national phase of International Application No. PCT/CN2016/091899, titled "ENERGY ABSORPTION DEVICE AND RAIL VEHICLE HAVING SAME", filed on Jul. 27, 2016, which claims the benefit of priorities to Chinese Patent Applications No. 201510642650.0 and No. 201520796535.4 both titled "ENERGY ABSORPTION DEVICE AND RAIL VEHICLE HAVING SAME" and filed with the Chinese State Intellectual Property Office on Sep. 30, 2015, the entire disclosures thereof are incorporated herein by reference.

FIELD

The present application relates to the technical field of rail vehicles, and more particularly to an energy absorption device and a rail vehicle having the energy absorption device.

BACKGROUND

With the increase of the velocity of high-speed trains, an air resistance applied to a head of the train during running is also increased. In order to reduce the air resistance and improve an aerodynamic performance of the train, the head of the high-speed train is designed to have a streamlined shape. Although the running resistance of the train is reduced and the velocity of the train is effectively increased due to the streamlined shape design, a front portion of the head of the train has a narrow space which can only accommodate a coupler and cannot accommodate a large-size energy absorption and anti-derailment control mechanism. Therefore, when two high-speed trains collide with each other, it is highly likely that the two trains are pressed together in a manner that one train is squeezed into another train, which results in a train derailment and causes serious accidents.

In order to solve the problems, in the conventional technology, an end of a chassis of the train is provided with an end sill transversely connected at an end of a draft sill, and the end sill is provided with a coupler connecting and buffering device. Or the coupler is configured as an energy absorption coupler to absorb the energy generated from the collision.

However, an energy absorption amount of the buffering device or the energy absorption coupler cannot meet the requirement of the strong impact force due to the limitation of its own structure, which directly affects the overall running safety of the train. Meanwhile, the direction of a destructive force generated in the collision is uncertain, thus the train is apt to derail during the collision, therefore, the conventional technology has the defects that the energy absorption amount is small and the train is apt to derail after collision, thus cannot meet the requirements of running safety.

In view of this, it is urgent to optimize the conventional technology to increase the energy absorption amount of the front end of the rail vehicle and minimize the possibility of derailment in collision from all angles, so as to improve the running safety of the rail vehicle in collision.

SUMMARY

In view of the defects, a technical issue to be addressed by the present application is to provide an energy absorption device to solve the problems in the conventional technology that the energy absorption effect is poor and a train derailment is apt to occur after collision.

An energy absorption device configured to be provided at a front end of a train is provided according to the present application, which includes a coupler seat, a support base, a crush pipe, a coupler, a guide member, an energy absorption component and an anti-climbing assembly. The support base is configured to be fixedly arranged at the front end of the train; the crush pipe is fixed to the coupler seat; a connecting end of the coupler is inserted into the crush pipe and is slidable with respect to the crush pipe; one end of the guide member is fixed to the coupler seat, and another end of the guide member is inserted into the support base and is slidable with respect to the support base; the guide member is configured to limit an oscillation of the crush pipe; the energy absorption component is provided between the coupler seat and the support base; and the anti-climbing assembly is fixedly arranged on the support base, and the anti-climbing assembly is compressible.

Preferably, a stopper is arranged inside the guide member to limit an extreme position of the connecting end of the coupler when sliding in the crush pipe.

Preferably, a leading member is fixedly arranged on the support base, and the leading member of the support base is slidably connected to the coupler seat to lead a moving direction of the coupler seat.

Preferably, the support base includes a slide base and a bottom base fixed to each other, and the guide member is slidable with respect to the slide base.

Preferably, the slide base is provided with a leading member for leading the guide member to slide with respect to the slide base, and the leading member of the slide base extends backward through the bottom base.

Preferably, a shear energy absorption component is provided between the leading member of the slide base and the guide member to fix the leading member of the slide base to the guide member.

Preferably, the anti-climbing assembly includes a lateral anti-climbing and energy absorption component located at each of two sides of the leading member of the support base and an upper anti-climbing and energy absorption component located on an upper surface of the leading member of the support base.

Preferably, a front end surface of the upper anti-climbing and energy absorption component is located at a front side of a front end surface of the lateral anti-climbing and energy absorption component.

Preferably, the lateral anti-climbing and energy absorption component includes a lateral supporting member fixedly arranged on the support base, a lateral connecting member fixed to the lateral supporting member, a lateral energy absorption member passing through the lateral connecting member and entering into the lateral supporting member, and a lateral anti-climbing member fixedly arranged at a front end of the lateral energy absorption member; and the upper anti-climbing and energy absorption component includes an upper supporting member fixedly arranged on the support base, an upper connecting member fixed to the upper supporting member, an upper energy absorption member passing through the upper connecting member and entering into the upper supporting member, and an upper anti-climbing member fixedly arranged at a front end of the upper energy absorption member.

A rail vehicle is further provided in the present application, which includes a vehicle head, and a front end of the vehicle head is provided with the energy absorption device described hereinbefore.

It can be seen from the above solutions that, an energy absorption device is provided according to the present application, which includes a coupler seat, a support base, a crush pipe, a coupler, a guide member, an energy absorption component and an anti-climbing assembly. The support base is configured to be fixedly arranged at a front end of a train; the crush pipe is fixed to the coupler seat; a coupler connecting end of the coupler is inserted into the crush pipe and is slidable with respect to the crush pipe. When two trains collide, first, the couplers are coupled up and subjected to impact forces, the coupler connecting end of each coupler slides into the crush pipe, and the primary vibration damping and energy absorption is finished with the deformation of the crush pipe. Second, the coupler connecting end continues sliding backward until the coupler head of the coupler collides with the coupler seat, to compress the coupler seat and allow the coupler seat to slide backward together with the coupler connecting end. Meanwhile, the energy absorption component arranged between the coupler seat and the support base is compressed, to further absorb the energy generated from the collision. Then, in the process of moving back to absorb energy, the anti-climbing assemblies of the two trains collide and engage with each other, and are compressed, and the anti-climbing assemblies also move back to absorb energy with the collision going further.

Compared with the conventional technology, the guide member is provided according to this solution to ensure that the coupler can run in the traveling direction along the rails. One end of the guide member is fixed to the coupler seat, another end of the guide member is inserted into the support base and can slide with respect to the support base, and the guide member can limit the oscillation of the crush pipe. With such an arrangement, in the process of vibration damping and energy absorption, the crush pipe limits a sliding direction of the coupler, while the guide member limits the oscillation of the crush pipe. Therefore, the guide member limit a degree of freedom of the coupler in a direction vertical to its length direction and a degree of freedom of the crush pipe in a direction vertical to its length direction, that is, a displacement of the coupler in the direction vertical to its length direction is limited, thereby providing reliable guarantee for avoiding the climbing and derailment of the train after the collision occurs.

Meanwhile, the design of the anti-climbing assembly increases the number of contacting connection points between two trains. During the collision, the more contacting connection points of the two trains are, the more degrees of freedom of the two trains are limited. Therefore, the derailment of two trains are less likely to occur, to ensure the collision safety of the train. The anti-climbing assembly itself can be compressed, thus on the one hand, energy generated from the collision can be absorbed through being compressed, and on the other hand, during the collision, the anti-climbing assembly can prevent itself from being broken by being compressed, so as to avoid losing the anti-derailment function.

In a preferable solution of the present application, a stopper is arranged inside the guide member to limit an extreme position of the connecting end of the coupler when sliding in the crush pipe. With such an arrangement, when the connecting end of the coupler slides out of the crush pipe, it strikes the stopper in the guide member, then the coupler and the guide member move back at the same time.

Obviously, the coupler strikes the stopper and drives the guide member to move backward together, making the energy generated from the collision be further absorbed during the striking process.

In another preferable solution of the present application, the anti-climbing assembly arranged on the support base includes a lateral anti-climbing and energy absorption component located at each of two sides of the leading member of the support base and an upper anti-climbing and energy absorption component located on an upper surface of the leading member of the support base. In this way, when two trains collide with each other, the anti-climbing assemblies engage with each other to limit degrees of freedom of the trains, so as to prevent the derailment, and the anti-climbing assemblies move back after they are engaged, to absorb shock and energy.

In another preferable solution of the present application, the support base is composed of a slide base and a bottom base fixed to each other, the slide base is provided with a leading member for leading the guide member to slide with respect to the slide base, and a shear energy absorption component is arranged between the leading member of the slide base and the guide member for fixing the leading member of the slide base and the guide member. With such an arrangement, when the coupler strikes the stopper, the guide member is forced to break the shear energy absorption component, then the coupler and the guide member slide backward together along the leading member of the slide base. During this process, energy generated from the train collision is further absorbed by striking the shear energy absorption component.

A rail vehicle provided in the present application has the energy absorption device, and since the energy absorption device has the above-described technical effects, the rail vehicle having the energy absorption device should also have corresponding technical effects.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. Apparently, the drawings in the following description are only some examples of the present application, and for those skilled in the art, other drawings may be obtained based on these drawings without any creative efforts.

REFERENCES IN FIG. 1 TO FIG. 16

1 coupler head,
2 coupler,
21 coupler connecting end,
3 coupler seat,
31 sliding block,
32 slideway,
4 energy absorption component,
5 support base,
51 slide base,
511 leading member,
52 bottom base,
6 crush pipe,
61 coupler mounting base,
62 expanding pipe,
7 guide member,
71 stopper,
8 shear energy absorption component,
81 spacer,
82 bolt,
9 lateral anti-climbing and energy absorption component,
91 lateral anti-climbing member,
92 lateral energy absorption member,
93 lateral connecting member,
94 lateral supporting member,
941 front plate of the lateral supporting member,
942 reinforcing plate of the lateral supporting member,
943 outer plate of the lateral supporting member,
10 upper anti-climbing and energy absorption component,
101 upper anti-climbing member,
102 upper energy absorption member,
103 upper connecting member,
104 upper supporting member,
1041 outer plate of the upper supporting member,
1042 reinforcing plate of the upper supporting member,
1043 front plate of the upper supporting member,
11 leading member,
111 guide slot,
a cross section varying portion.

DETAILED DESCRIPTION

The technical solution according to the embodiments of the present application will be described clearly and completely as follows in conjunction with the accompany drawings in the embodiments of the present application. It is obvious that the described embodiments are only a part of the embodiments according to the present application, rather than all of the embodiments. All the other embodiments obtained by those skilled in the art based on the embodiments in the present application without any creative work belong to the scope of the present application.

Figure 1:
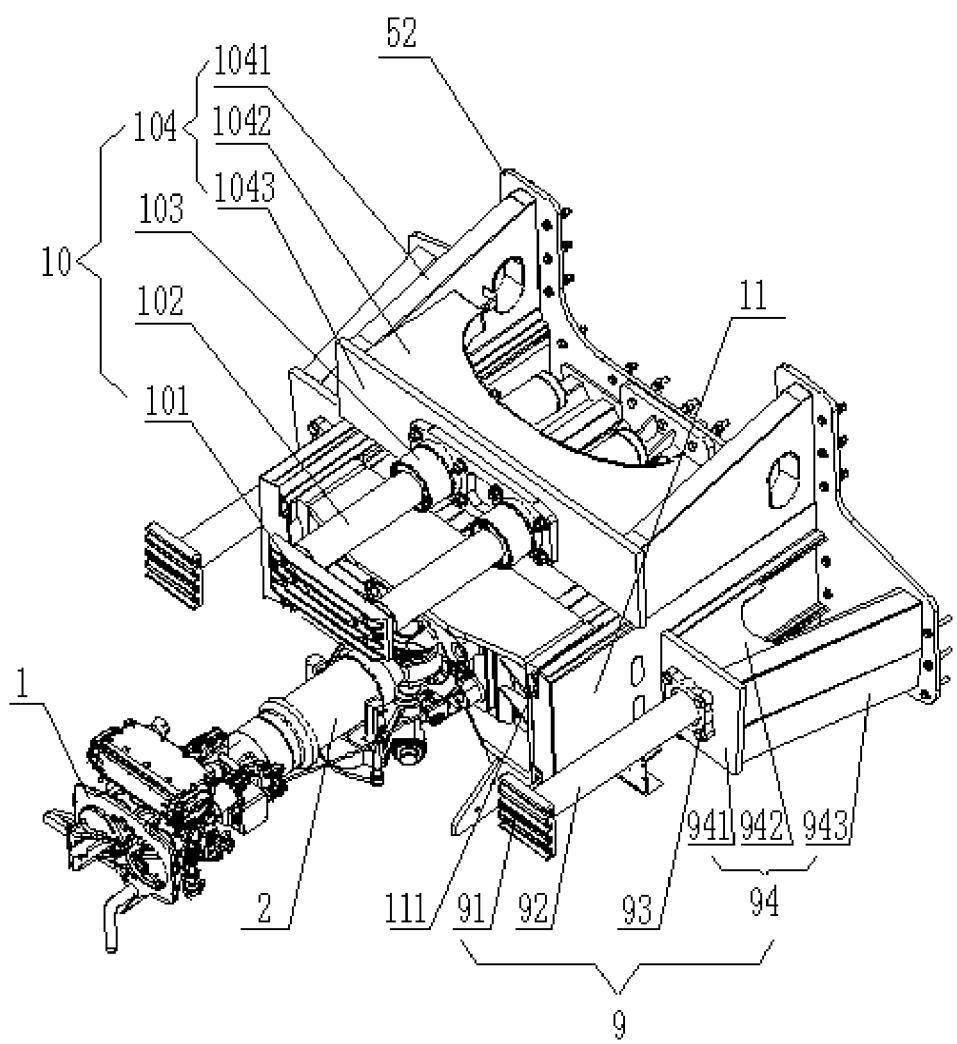
FIG. 1 is a schematic view showing the structure of a specific embodiment of an energy absorption device according to the present application.
Figure 2:
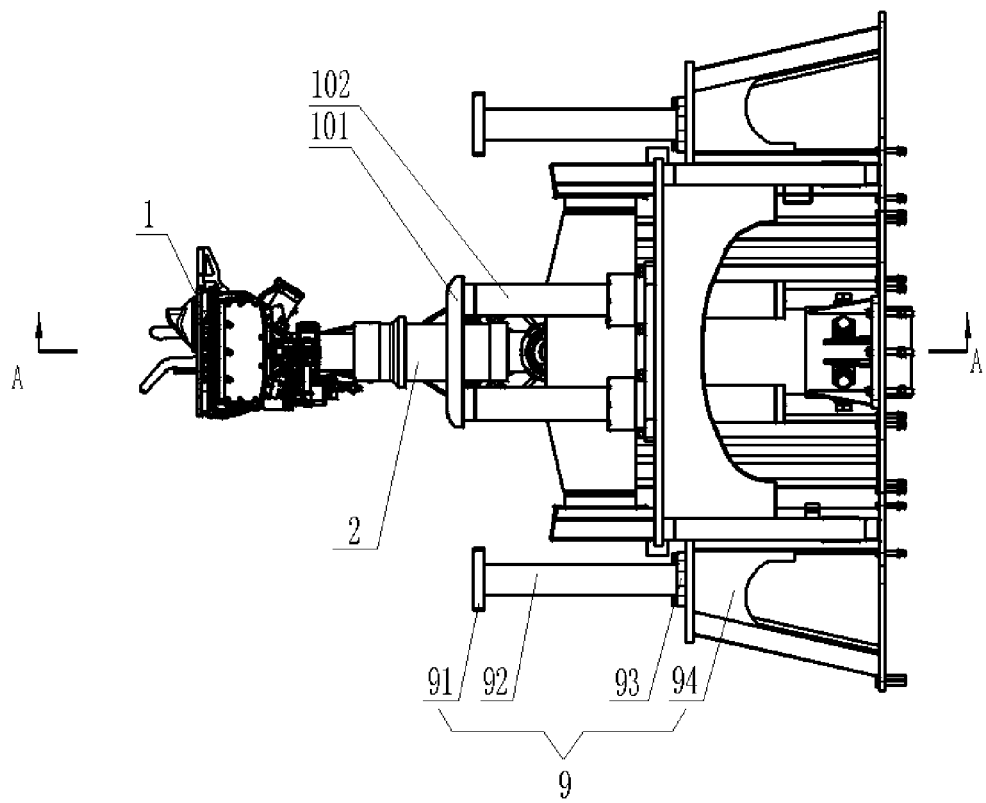
FIG. 2 is a top view showing the energy absorption device in FIG. 1 before a collision occurs.
Figure 3:
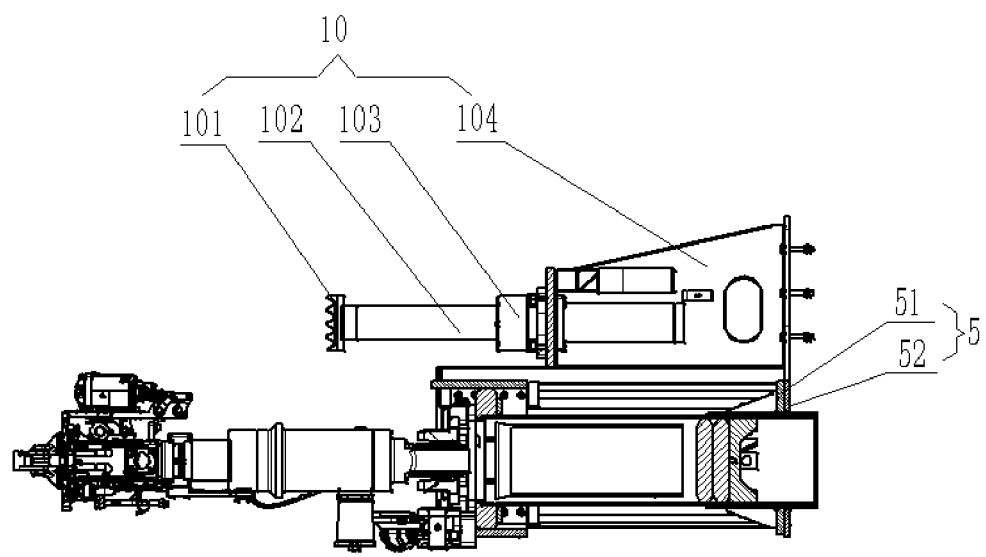
FIG. 3 is a sectional view showing the energy absorption device taken in a direction A-A in FIG. 2.
Figure 4:
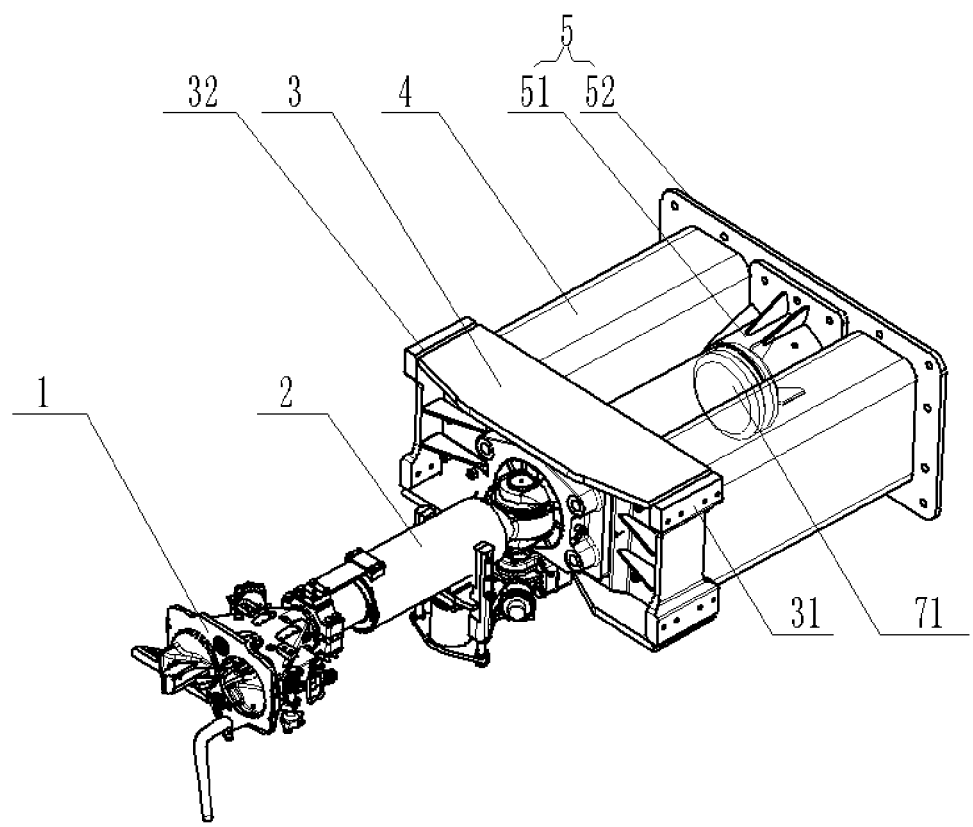
FIG. 4 is a schematic view showing an internal energy absorption structure of the energy absorption device in FIG. 1 before a collision occurs.
Figure 5:
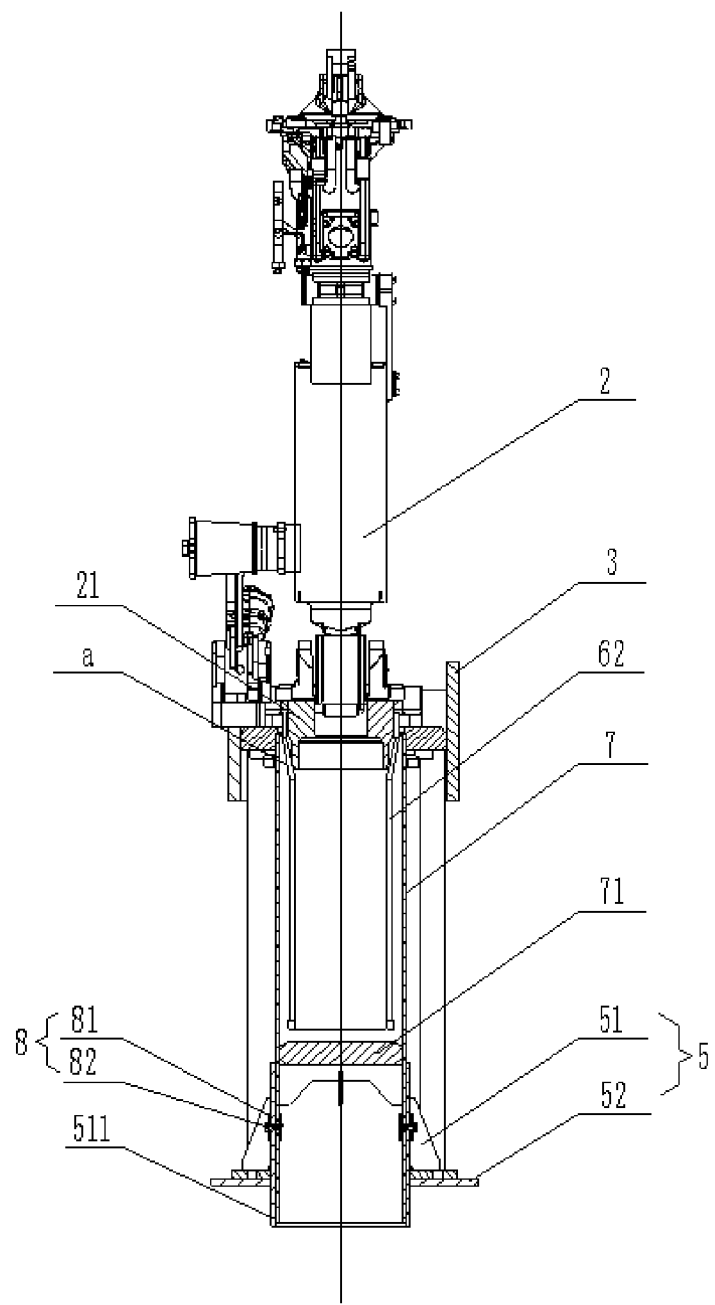
FIG. 5 is a sectional view of the internal energy absorption structure of the energy absorption device in FIG. 4 before a collision occurs.
Figure 6:
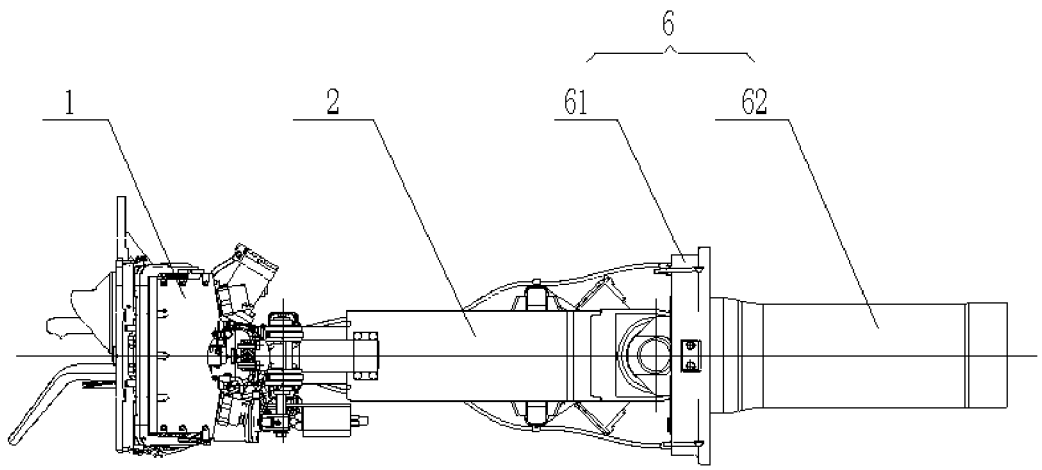
FIG. 6 is a schematic view showing positions of a coupler and a crush pipe of the energy absorption device in FIG. 1 before a collision occurs.

An energy absorption device assembled at a front end of a train is provided according to the embodiment, as shown in FIGS. 1 to 6. Wherein, FIG. 1 is a schematic view showing the structure of a specific embodiment of an energy absorption device according to the present application; FIG. 2 is a top view showing the energy absorption device in FIG. 1 before a collision occurs; FIG. 3 is a sectional view showing the energy absorption device taken in a direction A-A in FIG. 2; FIG. 4 is a schematic view showing an internal energy absorption structure of the energy absorption device in FIG. 1 before a collision occurs; FIG. 5 is a sectional view showing the internal energy absorption structure of the energy absorption device in FIG. 4 before a collision occurs; and FIG. 6 is a schematic view showing positions of a coupler 2 and a crush pipe 6 of the energy absorption device in FIG. 1 before a collision occurs.

The energy absorption device includes a support base 5, a coupler seat 3, a crush pipe 6, a coupler 2, a guide member 7, an energy absorption component 4, an upper anti-climbing and energy absorption component 10 and a lateral anti-climbing and energy absorption component 9. Wherein, the crush pipe 6 is fixed to the coupler seat 5. As shown in FIG. 6, the crush pipe 6 mainly includes a coupler mounting base 61 and an expanding pipe 62, and the crush pipe 6 is fixedly connected to the coupler seat 3 through the coupler mounting base 61. As shown in FIG. 5, a coupler connecting end 21 is inserted into the crush pipe 6 and is slidable with respect to the crush pipe 6. In this embodiment, the coupler mounting base 61 and the coupler seat 3 are preferably fixed by bolt connection, and of course, they may also be fixed by welding or riveting.

It is well known that, a train will be impacted during collision which causes the train to have an uncertain moving direction, and hence a derailment is apt to occur. In view of this, a guide member 7 is provided. As shown in FIG. 4, one end of the guide member 7 is fixed to the coupler seat 3, and another end of the guide member 7 is inserted into the support base 5 and is slidable with respect to the support base 5. The guide member 7 can limit an oscillation of the crush pipe 6. With such an arrangement, in the process of vibration damping and energy, the crush pipe 6 limits a sliding direction of the coupler 2, and the guide member 7 limits the oscillation of the crush pipe 6. Therefore, the guide member 7 limits a degree of freedom of the coupler 2 in a direction vertical to its own length direction and a degree of freedom of the crush pipe 6 in a direction vertical to its own length direction, that is, a displacement of the coupler 2 in the direction vertical to its own length direction is limited, thereby providing reliable guarantee for avoiding the climbing and derailment of the train after the collision.

Figure 8:
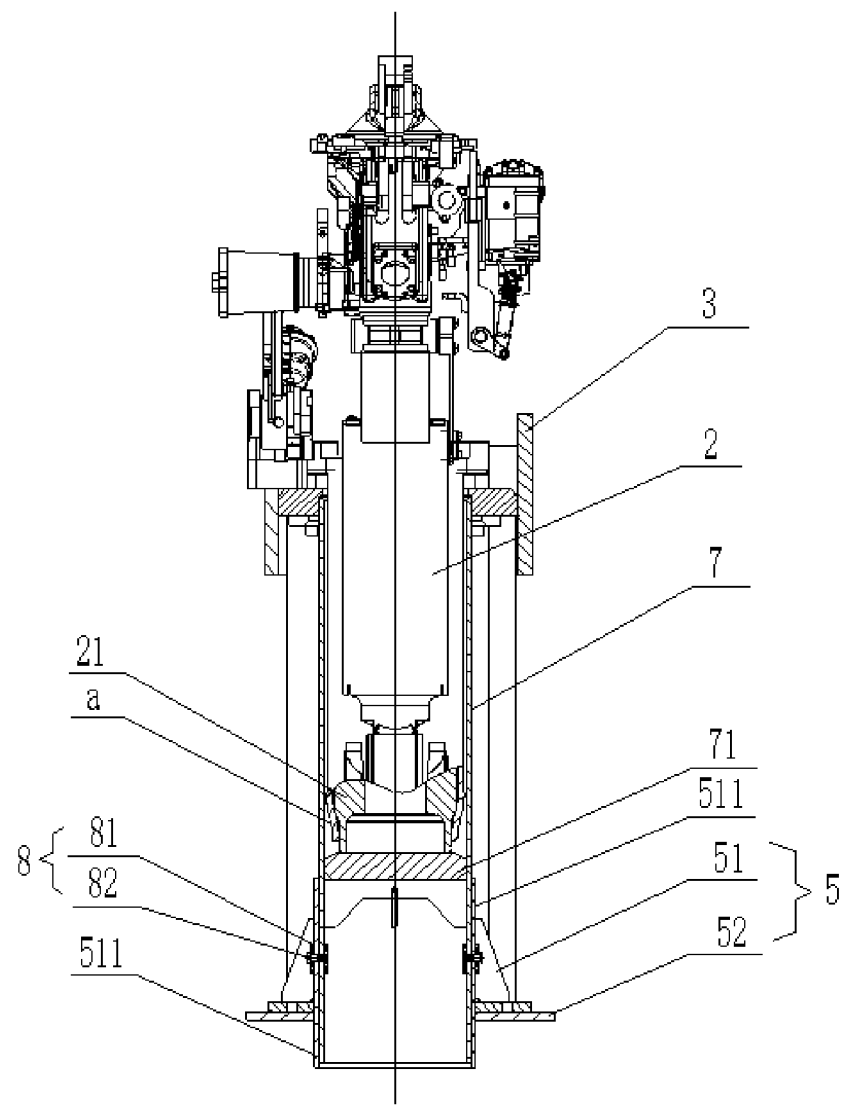
FIG. 8 is a schematic view showing the structure of the energy absorption device in FIG. 1 in a state that a coupler connecting end strikes a stopper after the collision occurs.
Figure 9:
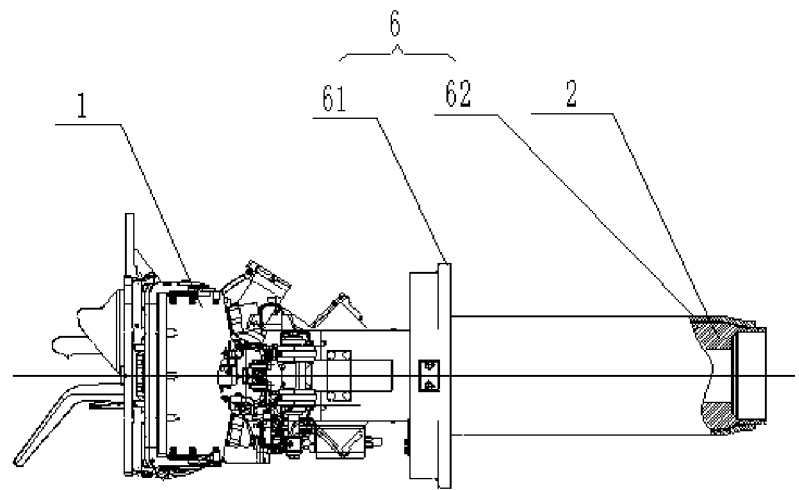
FIG. 9 is a schematic view showing the structure of the coupler and the crush pipe of the energy absorption device in FIG. 8 when the coupler connecting end strikes the stopper after the collision occurs.

A stopper 71 is fixedly arranged inside the guide member 7 to define an extreme position of the coupler 2 when sliding in the crush pipe 6. A shear energy absorption component 8 is fixedly arranged between the guide member 7 and the support base 5. Reference is made to FIG. 8 and FIG. 9, wherein, FIG. 8 is a schematic view showing the structure of the energy absorption device in FIG. 1 in a state that the coupler connecting end 21 strikes the stopper 71 after a collision occurs, and FIG. 9 is a schematic view showing the structure of the coupler and the crush pipe of the energy absorption device in FIG. 8 in a state that the coupler connecting end strikes the stopper after the collision occurs.

It should be noted that, the stopper 71 in this embodiment is a blockage that fills an entire cross section of the guide member 7. Of course, a collar or a protruding block can also be fixedly arranged in the guide member 7 to limit the sliding of the coupler 2 in the guide member 7. Similarly, the shear energy absorption component 8 is composed of a bolt 82 and a spacer 81, and of course, a rivet or a pin may also be employed as long as it can have a pre-fixing effect. Moreover, any members that can be sheared by the impact of the coupler 2 and the guide member 7 are all within the scope of protection of the present application.

Figure 7:
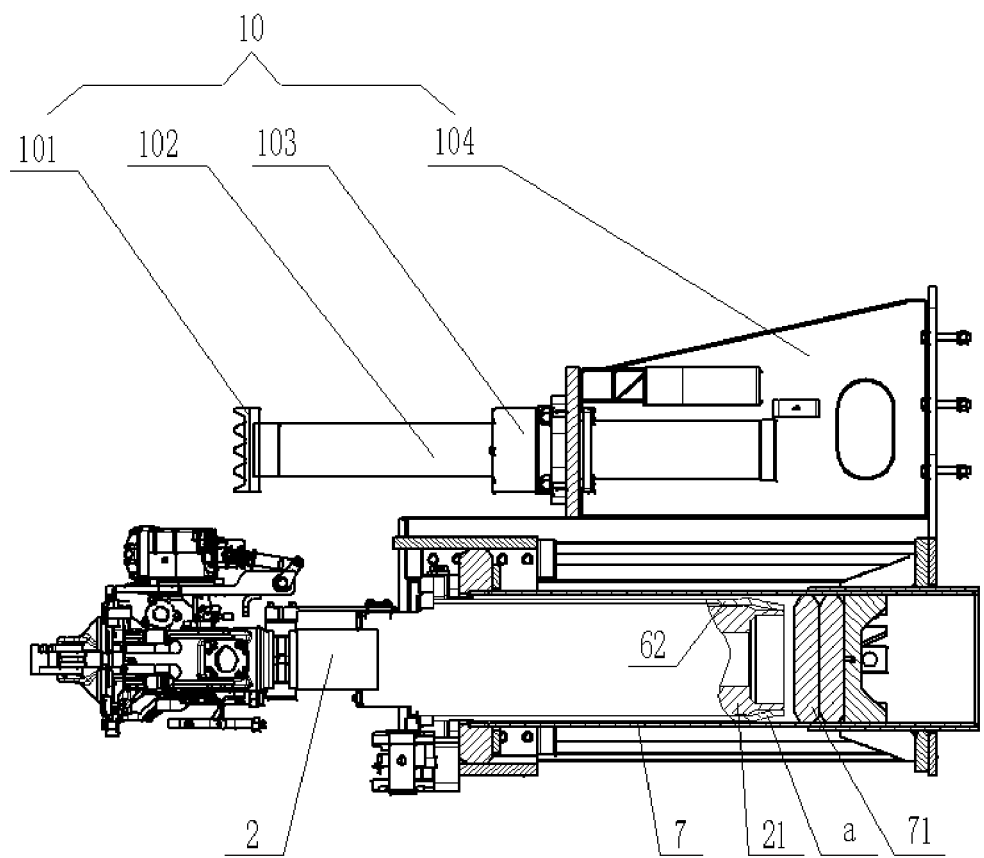
FIG. 7 is a schematic view showing the structure of the energy absorption device in FIG. 1 in a state that the coupler is pressed into the crush pipe and the crush pipe expands and absorbs energy after a collision occurs.

When two trains collide, first, the coupler heads 1 of the couplers 2 are coupled up, each of the couplers 2 is subjected to an impact force and a coupler connecting end 21 of the coupler 2 slides into the crush pipe 6 and impacts a cross section varying portion a at a rear end of the expanding pipe 62, making the cross section varying portion a of the expanding pipe 62 to expand and deform, and with the deformation of the expanding pipe 62, the primary vibration damping and energy absorption is finished. Reference is made to FIG. 7, which is a schematic view showing the structure of the energy absorption device in FIG. 1 in a state that the coupler 2 is pressed into the crush pipe 6 and the crush pipe 6 expands and absorbs energy after the collision occurs. In the present application, locality terms are defined based on a traveling direction of the train, and the traveling direction of the train is defined as "front" and the direction opposite to "front" is defined as "rear", and it should be understood that, the use of the locality terms does not limit the scope of protection of the present application.

Second, when the primary vibration damping and energy absorption is finished, the connecting end of the coupler 2 slides out of the crush pipe 6 and strikes the stopper 71 fixedly arranged in the guide member 7, then the coupler 2, together with the guide member 7, breaks the shear energy absorption component 8, and the collision energy is absorbed during the process of breaking the shear energy absorption component 8, thereby finishing the secondary energy absorption. A distance between a front end surface of the stopper 71 and a rear end surface of the coupler 2 is smaller than a sliding distance of the coupler 2 within the crush pipe 6, therefore, the coupler head 1 will not collide with the coupler seat 3 before the coupler connecting end 21 strikes the stopper 71, which ensures that the energy absorption process can be performed in a specified sequence.

Figure 16:
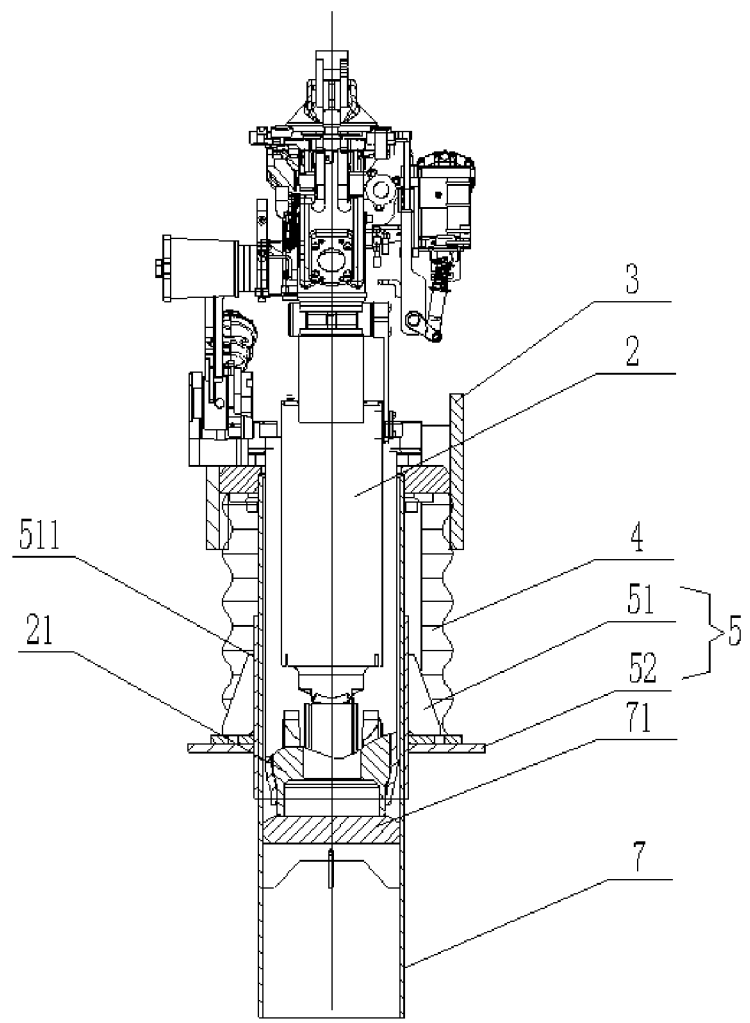
FIG. 16 is a schematic view showing the internal energy absorption structure of the energy absorption device in FIG. 1 when the collision is finished.

Then, in case that the impact power of the collision is not absorbed completely after the secondary vibration damping and energy absorption is finished, the coupler connecting end 21 keeps sliding backward until the coupler head 1 of the coupler 2 collides with the coupler seat 3, to compress the coupler seat 3 and allow the coupler seat 3 to slide backward together with the coupler connecting end 21 along a leading member 11 fixedly arranged on the support base 5. Meanwhile, an energy absorption component 4 arranged between the coupler seat 3 and the support base 5 is compressed, to further absorb the energy generated from the collision, thereby effectively increasing the energy absorption amount of the front end of the train. Reference is made to FIG. 16, which is a schematic view showing an internal energy absorption structure of the energy absorption device in FIG. 1 when the collision is finished. The support base 5 is fixedly arranged at the front end of the train, the leading member 11 is fixedly arranged on the support base 5 and can be slidably connected to the coupler seat 3 to lead a moving direction of the coupler seat 3. The energy absorption component 4 is arranged between the coupler seat 3 and the support base 5. Because the leading member 11 can orient the direction of the coupler seat 3, the energy absorption component 4 can be compressed in a predetermined direction, which avoids an incomplete compression of the energy absorption component 4 due to the deviation of the sliding direction of the coupler seat 3 in the compressing process.

As shown in FIG. 5, the support base 5 includes a slide base 51 and a bottom base 52 fixed to each other. Such design facilitates the installation and detachment, and the slide base 51 and the bottom base 52 can use different materials according to the respective structural strengths. A leading member 511 of the slide base 51 extends outward through the bottom base 52, to ensure that during the process of the coupler seat 3 compressing the energy absorption component 4 to move backward, the guide member 7 can keep sliding within the leading member 511. In this way, even though the guide member 7 slides out of the bottom base 52, the guide member 7 will not deviate due to the limitation of the leading member 511

In addition, the rigidity of the energy absorption component 4 is smaller than the rigidity of the coupler seat 3, the coupler seat 3 is required to compress the energy absorption component 4 during the collision to absorb the energy generated from the collision, and if the coupler seat 3 has already been damaged before the energy absorption component 4 is destroyed, the energy absorption effect will be adversely affected directly. In this embodiment, the energy absorption component 4 is formed by a section steel having a five-hole section, the section steel is arranged around the guide member 7 and connected to the coupler seat 3 and the support base 5. This material has a better stability than a single circular pipe or square pipe, and is not apt to cause an accidental deformation. Moreover, the section steel having the five-hole section has a large deformation area and thus can absorb more energy during collision. Of course, a spring set may also be employed to replace the section steel having the five-hole section. A sliding block 31 and a slideway 32 are arranged at two ends of the coupler seat 3 to cooperate with a guide slot 111 on the leading member 11. In this way, the coupler seat 3 can move along the guide slot 111 when the coupler seat 3 is impacted to compress the energy absorption component 4, which can ensure that the coupler seat 3 will not deflect and deform during the compression process. In this embodiment, the sliding block 31 and the slideway 32 are arranged at the two ends of the coupler seat 3 to cooperate with the leading member 11, and of course, a slide rail and a groove-shaped structure and the like may also be employed to realize the same function.

Further, as shown in FIG. 1, an anti-climbing assembly is fixedly arranged on the support base 5, and the anti-climbing assembly may be arranged to surround the leading member 11. The anti-climbing assembly includes two lateral anti-climbing and energy absorption components 9 respectively located at two sides of the leading member 11 and an upper anti-climbing and energy absorption component 10 located on an upper surface of the leading member 11. When two trains collide, the trains are not apt to derail from two sides of the rails due to the restriction of the rails, but are apt to derail by climbing over the rails. In order to minimize the probability of the train derailment caused by climbing over the rails, a front end surface of the upper anti-climbing and energy absorption component 10 is arranged at a front side of a front end surface of each of the lateral anti-climbing and energy absorption components 9. In this way, when two trains collide, apart from the coupler 2, the first contacting point is the upper anti-climbing and energy absorption component 10, which limits a degree of freedom of the train climbing upward. The higher the collision contacting point is, the less likely the two trains climb over the rails. Such design further prevents the derailment of the trains caused by climbing over the rails.

In addition, as shown in FIG. 1, the upper anti-climbing and energy absorption component 10 includes an upper supporting member 104 fixedly arranged on the support base 5, an upper connecting member 103 fixedly arranged on the upper supporting member 104, an upper energy absorption member 102 which can pass through the upper connecting member 103 and enter into the upper supporting member 104, and an upper anti-climbing member 101 fixedly arranged at a front end of the upper energy absorption member 102. Wherein, the upper anti-climbing member 101 is provided with a toothed groove, and thus two upper anti-climbing members 101 can engage with each other after two trains collide. The upper energy absorption member 102 is formed by a front pipe and a rear pipe insertedly connected, wherein an inner pipe can slide in an outer pipe, and a slide cavity of the outer pipe is gradually contracted with respect to the inner pipe. When the upper anti-climbing member 101 is struck, the upper anti-climbing member 101 is subjected to an impact force to push and compress the two pipes of the upper energy absorption member 102, and with the compression going further, the inner pipe breaks open the slide cavity of the outer pipe to absorb energy by striking. Of course, apart from the expanding type energy absorption, the compression energy absorption manner of the upper energy absorption member 102 can also be designed as a planing type energy absorption. For example, a cutting knife may be arranged on the upper connecting member 103 or inside the outer pipe, and the energy can be absorbed by cutting the wall thickness of the upper energy absorption member 102. The upper energy absorption member 102 may also be formed by square pipes or other section steels, as long as the energy can be absorbed by expansion or cutting.

The upper supporting member 104 includes an outer plate 1041, a reinforcing plate 1042, and a front plate 1043. A rear end of the outer plate 1041 of the upper supporting member is fixedly connected to the support base 5 and the leading member 11, and the front plate 1043 of the upper supporting member is fixedly arranged at a front end of the outer plate 1041 of the upper supporting member. A cavity configured to accommodate the upper energy absorption member 102 is defined by the front plate 1043 of the upper supporting member, the outer plate 1041 of the upper supporting member, the leading member 11 and the support base 52. In order to increase the strength of the cavity, the reinforcing plate 1042 of the upper supporting member is arranged between the front plate 1043 and the outer plate 1041 of the upper supporting member.

Similar to the upper anti-climbing and energy absorption component 10, two sides of the leading member 11 are both provided with a lateral anti-climbing and energy absorption component 9, to prevent a lateral derailment of the train after the collision. The lateral anti-climbing and energy absorption component 9 includes a lateral supporting member 94 fixedly arranged on the support base 5, a lateral connecting member 93 fixedly arranged on the lateral supporting member 94, a lateral energy absorption member 92 which can pass through the lateral connecting member 93 and enter into the lateral supporting member 94, and a lateral anti-climbing member 91 fixedly arranged at a front end of the lateral energy absorption member 92. The energy absorption manner of the lateral energy absorption member 92 is a planing type energy absorption, which, of course, can also be configured as an expansion type energy absorption. The lateral supporting member 94 includes an outer plate 943 fixedly arranged on the support base 5 and a front plate 941 fixedly arranged at a front end of the outer plate 943. In this way, a cavity configured to accommodate the lateral energy absorption member 92 is defined by the front plate 941 and the outer plate 943 of the lateral supporting member and the leading member 11. A reinforcing plate 942 of the lateral supporting member is arranged at a front end of the cavity to increase the strength of the cavity.

By arranging the anti-climbing assembly, displacements of two trains in a direction vertical to their length directions are limited, so that the two trains will not climb over the rails and derail. When a collision occurs, the anti-climbing assembly itself can be compressed, thus on the one hand, the energy generated from the collision is absorbed by the compression, and on the other hand, during the collision, the anti-climbing assembly prevents itself from being broken by being compressed, to avoid losing the anti-derailment function.

Figure 10:
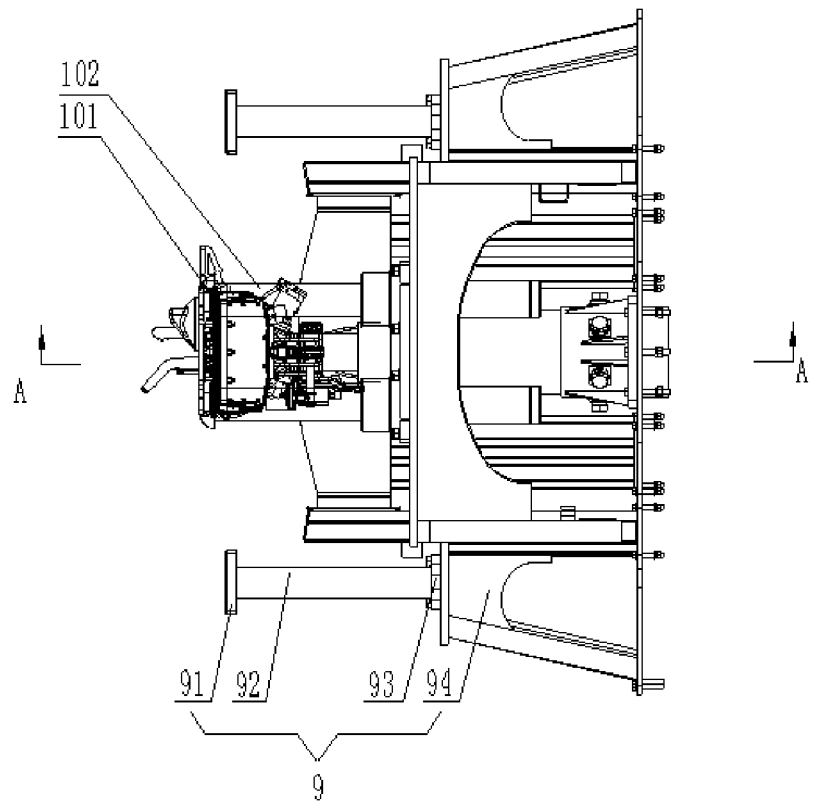
FIG. 10 is a schematic view showing the structure of the energy absorption device in FIG. 1 in a state that a front end surface of the coupler moves back to be flush with a front end surface of an upper anti-climbing and energy absorption component after the collision occurs.
Figure 11:
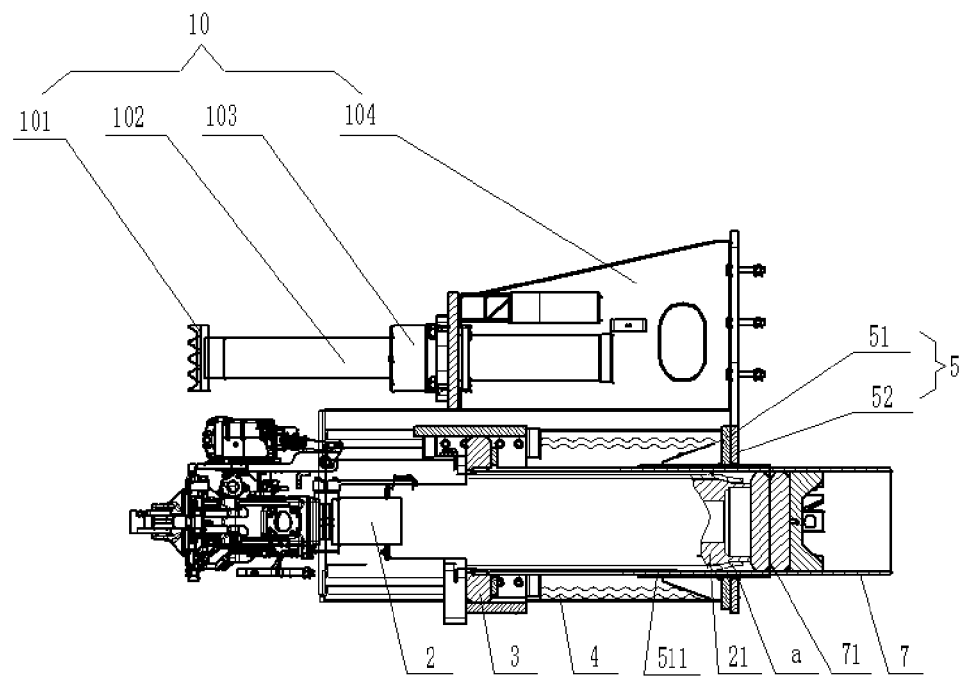
FIG. 11 is a sectional view taken in a direction A-A in FIG. 10.
Figure 12:
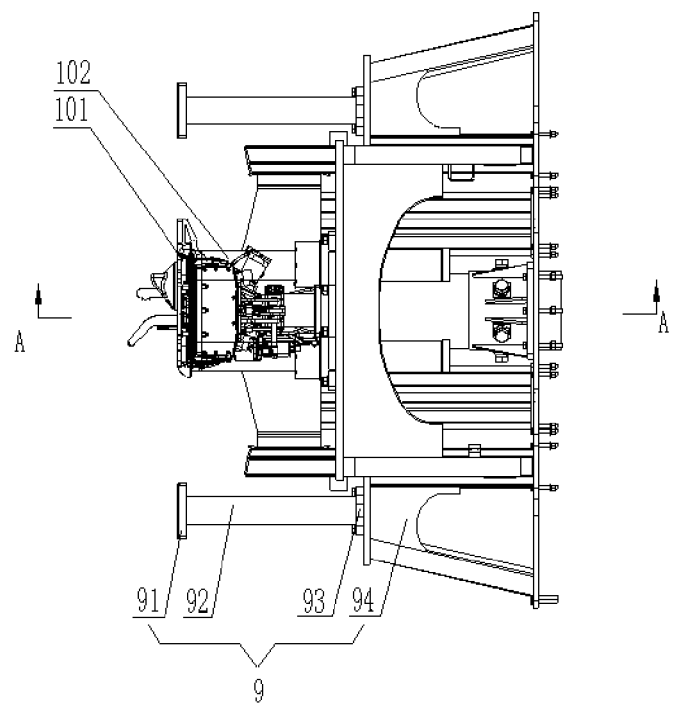
FIG. 12 is a schematic view showing the structure of the energy absorption device in FIG. 1 in a state that the front end surface of the coupler and the front end surface of the upper anti-climbing and energy absorption component move back to be flush with a front end surface of a lateral anti-climbing and energy absorption member after the collision occurs.
Figure 13:
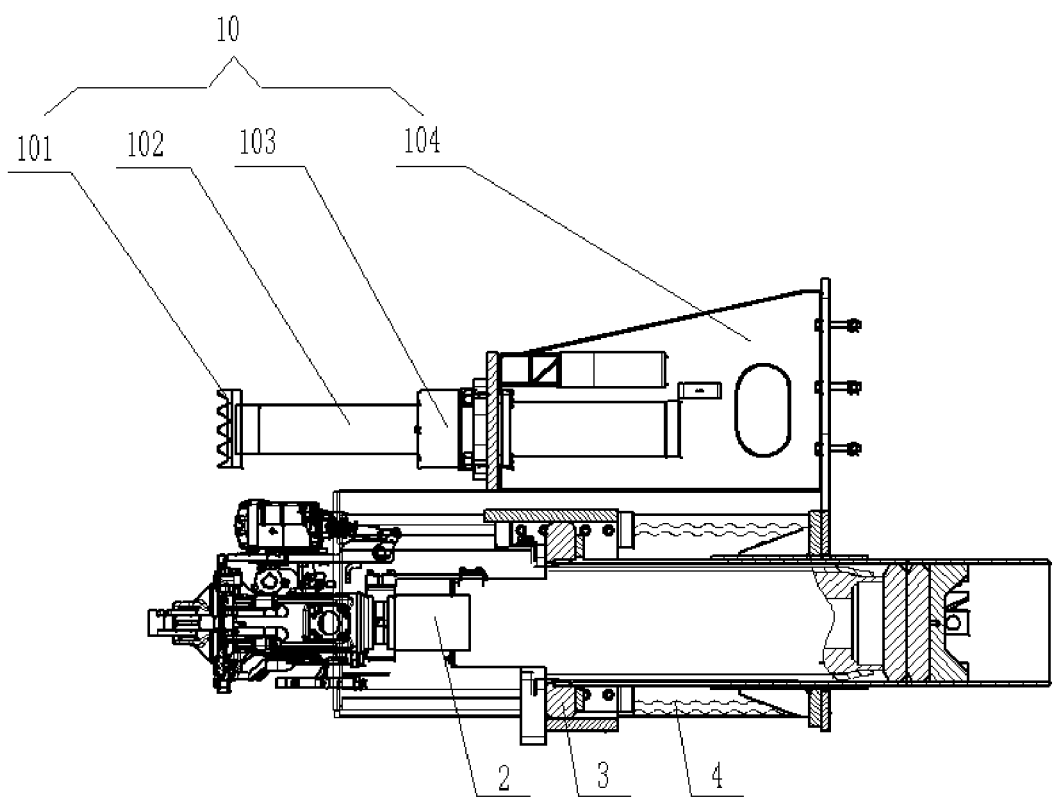
FIG. 13 is a sectional view taken in a direction A-A in FIG. 12.
Figure 14:
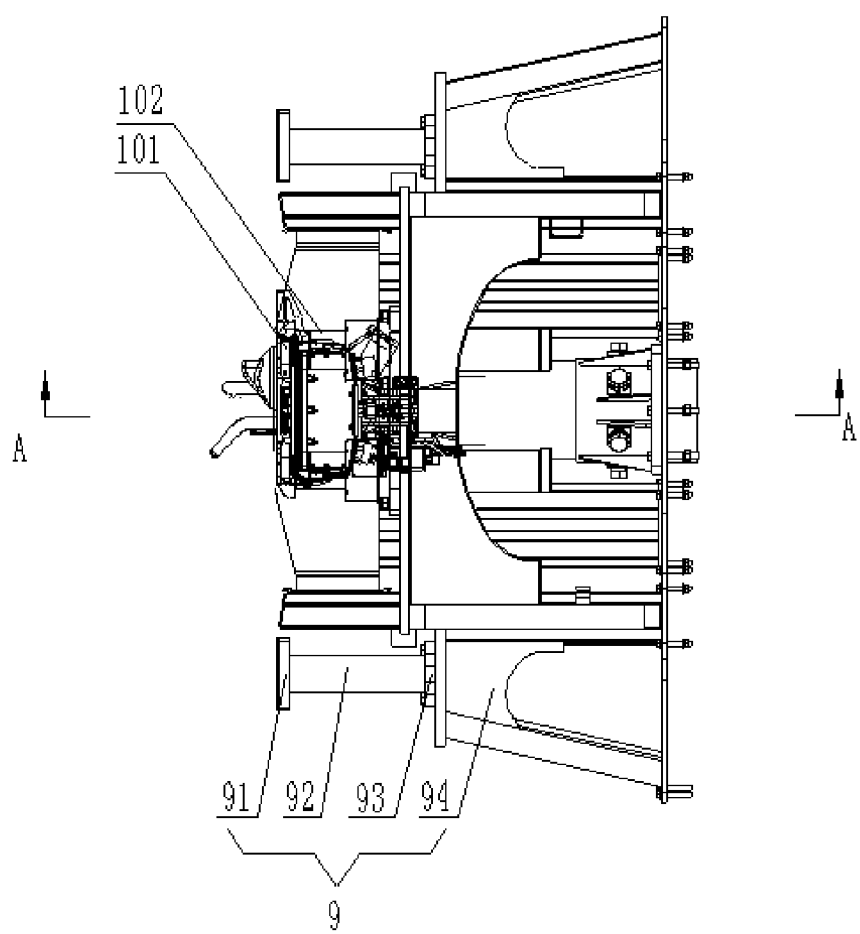
FIG. 14 is a schematic view showing the structure of the energy absorption device in FIG. 1 when the collision is finished.
Figure 15:
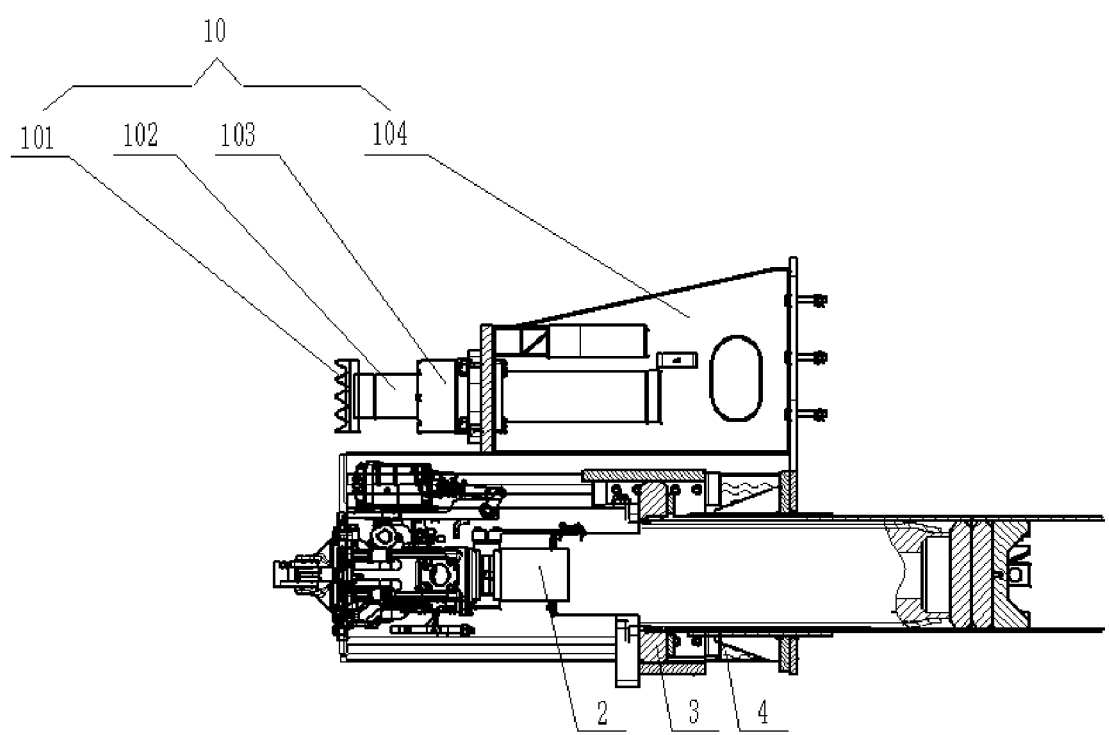
FIG. 15 is a sectional view taken in a direction A-A in FIG. 14.

The working process of the energy absorption device after the train collision occurs is summarized as follows:

a. as shown in FIG. 7, the coupler connecting end 21 subjected to the impact force strikes the cross section varying portion a of the expanding pipe 62 located inside the guide member 7, to break open the thin expanding pipe 62, then the coupler 2 slides into the expanding pipe 62, and thus the primary collision energy absorption is finished.

b. as shown in FIG. 8, the coupler 2 strikes the stopper 71 fixed inside the guide member 7, then the coupler 2, together with the guide member 7, shears off the shear energy absorption component 8, and thus the secondary collision energy absorption is finished.

c. reference is made to FIG. 10 and FIG. 11, wherein FIG. 10 is a schematic view showing the structure of the energy absorption device in FIG. 1 in a state that a front end surface of the coupler 2 moves back to be flush with a front end surface of the upper anti-climbing and energy absorption component 10 after the collision occurs; and FIG. 11 is a sectional view taken in a direction A-A in FIG. 10. The coupler 2 and the guide member 7 slide backward together inside the leading member 511, the coupler seat 3 presses the energy absorption component 4 until two upper anti-climbing members 101 come into contact with each other, meanwhile the front end surface of the coupler 2 moves back to be flush with the front end surface of the upper anti-climbing and energy absorption component 10, and then the coupler 2 keeps moving back together with the upper anti-climbing and energy absorption component 10 to absorb energy.

d. reference is made to FIG. 12 and FIG. 13, wherein FIG. 12 is a schematic view showing the structure of the energy absorption device in FIG. 1 in a state that the front end surface of the coupler 2 and the front end surface of the upper anti-climbing and energy absorption component 10 move back to be flush with the front end surface of the lateral anti-climbing and energy absorption component 9 after the collision occurs; and FIG. 13 is a sectional view taken in a direction A-A in FIG. 12. When the front end surface of the coupler 2 and the front end surface of the upper anti-climbing and energy absorption member 10 are compressed to move back to be flush with the front end surface of the lateral anti-climbing and energy absorption member 9, the lateral anti-climbing and energy absorption members 9 of the two trains come into contact with each other, and then the coupler 2, the upper anti-climbing and energy absorption component 10 and the lateral anti-climbing and energy absorption components 9 move back at the same time to absorb energy.

e. reference is made to FIG. 14 and FIG. 15, wherein FIG. 14 is a schematic view showing the structure of the energy absorption device in FIG. 1 after the collision is finished; and FIG. 15 is a sectional view taken in a direction A-A in FIG. 14. When the coupler 2 and the coupler seat 3 have finished absorbing energy by compressing the energy absorption component 4, the upper anti-climbing and energy absorption component 10 and the lateral anti-climbing and energy absorption components 9 have finished absorbing energy at the same time by moving back.

In the whole process, the energy absorption device realizes multistage energy absorption in a limited space, which include the following stages of energy absorption. The coupler connecting end 21 strikes the cross section varying portion a of the expanding pipe 62, and energy is absorbed in the process that the coupler 2 breaks open and slides into the expanding pipe 62. The coupler 2, together with the guide member 7, strikes the shear energy absorption component 8 and moves back to absorb energy. The coupler 2, the crush pipe 6, the guide member 7 and the coupler seat 3 move back together to compress the energy absorption component 4 to absorb energy. The coupler 2, the crush pipe 6, the guide member 7, the coupler seat 3 and the upper anti-climbing and energy absorption component 10 move back to absorb energy. The coupler 2, the crush pipe 6, the guide member 7, the coupler seat 3, the upper anti-climbing and energy absorption component 10 and the lateral anti-climbing and energy absorption components 9 move back to absorb energy. During the period of buffering and energy absorption, the coupler 2 keeps moving along the expanding pipe 62 located inside the guide member 7, in this way, the guide member 7 limits a degree of freedom of the coupler 2 in a direction vertical to its own length direction, that is, a displacement of the coupler 2 in the direction vertical to its own length direction is limited, thereby providing reliable guarantee for avoiding the climbing and derailment of the train after the collision.

In addition to the energy absorption device, a rail vehicle is further provided in this embodiment, which includes a vehicle head, and a front end of the vehicle head is provided with the energy absorption device described hereinabove. It should be noted that, a main body of the rail vehicle is not the core of the present application, and may be implemented by the conventional technology, therefore will not be described herein.

The above embodiments in this specification are described in a progressive manner. Each of the embodiments is mainly focused on describing its differences from other embodiments, and references may be made among these embodiments with respect to the same or similar portions among these embodiments.

Based on the above description of the disclosed embodiments, the person skilled in the art is capable of carrying out or using the present application. It is obvious for the person skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

What is claimed is:

1. An energy absorption device, configured to be provided at a front end of a train, comprising:
   a coupler seat;
   a support base configured to be fixedly arranged at the front end of the train;
   a crush pipe fixed to the coupler seat;
   a coupler having a connecting end inserted into the crush pipe and slidable with respect to the crush pipe;
   a guide member having one end fixed to the coupler seat, and another end inserted into the support base and slidable with respect to the support base; wherein the guide member is configured to limit an oscillation of the crush pipe;
   an energy absorption component arranged between the coupler seat and the support base; and
   an anti-climbing assembly fixedly arranged on the support base and the anti-climbing assembly being compressible,
   wherein a stopper, which is a blockage that fills an entire cross section of the guide member, is arranged inside the guide member to limit an extreme position of the connecting end of the coupler when sliding in the crush pipe.

2. The energy absorption device according to claim 1, wherein a leading member is fixedly arranged on the support base, and the leading member of the support base is slidably connected to the coupler seat to lead a moving direction of the coupler seat.

3. The energy absorption device according to claim 1, wherein the support base comprises a slide base and a bottom base fixed to each other, and the guide member is slidable with respect to the slide base.

4. The energy absorption device according to claim 3, wherein the slide base is provided with a leading member for leading the guide member to slide with respect to the slide base, and the leading member of the slide base extends backward through the bottom base.

5. The energy absorption device according to claim 4, wherein a shear energy absorption component is provided between the leading member of the slide base and the guide member to fix the leading member of the slide base to the guide member.

6. The energy absorption device according to claim 2, wherein the anti-climbing assembly comprises a lateral anti-climbing and energy absorption component located at each of two sides of the leading member of the support base and an upper anti-climbing and energy absorption component located on an upper surface of the leading member of the support base.

7. The energy absorption device according to claim 6, wherein a front end surface of the upper anti-climbing and energy absorption component is located at a front side of a front end surface of the lateral anti-climbing and energy absorption component.

8. The energy absorption device according to claim 6, wherein the lateral anti-climbing and energy absorption component comprises a lateral supporting member fixedly arranged on the support base, a lateral connecting member fixed to the lateral supporting member, a lateral energy absorption member passing through the lateral connecting member and entering into the lateral supporting member, and a lateral anti-climbing member fixedly arranged at a front end of the lateral energy absorption member; and the upper anti-climbing and energy absorption component comprises an upper supporting member fixedly arranged on the support base, an upper connecting member fixed to the upper supporting member, an upper energy absorption member passing through the upper connecting member and entering into the upper supporting member, and an upper anti-climbing member fixedly arranged at a front end of the upper energy absorption member.

9. A rail vehicle, comprising a vehicle head, wherein a front end of the vehicle head is provided with the energy absorption device according to claim 1.

10. A rail vehicle, comprising a vehicle head, wherein a front end of the vehicle head is provided with the energy absorption device according to claim 2.

11. A rail vehicle, comprising a vehicle head, wherein a front end of the vehicle head is provided with the energy absorption device according to claim 3.

12. The energy absorption device according to claim 2, wherein the support base comprises a slide base and a bottom base fixed to each other, and the guide member is slidable with respect to the slide base.

13. The energy absorption device according to claim 12, wherein the slide base is provided with a leading member for leading the guide member to slide with respect to the slide base, and the leading member of the slide base extends backward through the bottom base.

14. The energy absorption device according to claim 13, wherein a shear energy absorption component is provided between the leading member of the slide base and the guide member to fix the leading member of the slide base to the guide member.

15. The energy absorption device according to claim 7, wherein the lateral anti-climbing and energy absorption component comprises a lateral supporting member fixedly arranged on the support base, a lateral connecting member fixed to the lateral supporting member, a lateral energy absorption member passing through the lateral connecting member and entering into the lateral supporting member, and a lateral anti-climbing member fixedly arranged at a front end of the lateral energy absorption member; and the upper anti-climbing and energy absorption component comprises an upper supporting member fixedly arranged on the support base, an upper connecting member fixed to the upper supporting member, an upper energy absorption member passing through the upper connecting member and entering into the upper supporting member, and an upper anti-climbing member fixedly arranged at a front end of the upper energy absorption member.

\* \* \* \* \*